United States Patent
Chen et al.

(10) Patent No.: US 12,362,417 B2
(45) Date of Patent: Jul. 15, 2025

(54) BATTERY MODULE, BATTERY PACK, DEVICE AND ASSEMBLY METHOD OF BATTERY MODULE

(71) Applicant: CONTEMPORARY AMPEREX TECHNOLOGY (HONG KONG) LIMITED, Hong Kong (CN)

(72) Inventors: Sien Chen, Ningde (CN); Shoujiang Xu, Ningde (CN); Xiaoshan Dai, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1056 days.

(21) Appl. No.: 17/358,552

(22) Filed: Jun. 25, 2021

(65) Prior Publication Data

US 2021/0320360 A1    Oct. 14, 2021

Related U.S. Application Data

(63) Continuation of application No. PCT/CN2020/137077, filed on Dec. 17, 2020.

(30) Foreign Application Priority Data

Dec. 31, 2019   (CN) .......................... 201911411433.5

(51) Int. Cl.
*H01M 50/20* (2021.01)
*H01M 50/209* (2021.01)

(52) U.S. Cl.
CPC ...... *H01M 50/209* (2021.01); *H01M 2220/20* (2013.01)

(58) Field of Classification Search
None
See application file for complete search history.

(56) References Cited

U.S. PATENT DOCUMENTS

2009/0017368 A1   1/2009   Hayashi et al.
2012/0210541 A1   8/2012   Koncelik, Jr.
(Continued)

FOREIGN PATENT DOCUMENTS

CA      3017566 A1     9/2017
CN    101920863 A     12/2010
(Continued)

OTHER PUBLICATIONS

International Search Report and Written Opinion dated Mar. 16, 2021 received in International Application No. PCT/CN2020/137077.

(Continued)

*Primary Examiner* — Barbara L Gilliam
*Assistant Examiner* — Angela J Martin
(74) *Attorney, Agent, or Firm* — Scully, Scott, Murphy & Presser, P.C.

(57) ABSTRACT

The present application relates to a battery module, a battery pack, a device and an assembly method of the battery module, the battery module includes: a battery cell arrangement structure including a plurality of battery cells stacked upon one another; a cable tie, the cable tie surrounding outside the battery cell arrangement structure, and at least including a first cable tie and a second cable tie of different materials; and where at least part of the first cable tie is located on a side of the second cable tie close to the battery cell. The cable tie can have characteristics of the first cable tie and the second cable tie, which improves an applicability of the cable tie. In this case, it is helpful to improve a connection reliability of the cable tie to the battery cell arrangement structure, and to release an expansion force of the battery module.

17 Claims, 13 Drawing Sheets

(56) References Cited

U.S. PATENT DOCUMENTS

| | | | | |
|---|---|---|---|---|
| 2014/0087231 A1* | 3/2014 | Schaefer | ........... | H01M 10/6554 429/120 |
| 2016/0111693 A1 | 4/2016 | Reitzle et al. | | |
| 2017/0133706 A1 | 5/2017 | Ejima | | |

FOREIGN PATENT DOCUMENTS

| | | | | |
|---|---|---|---|---|
| CN | 205645945 U | | 10/2016 | |
| CN | 206236730 U | | 6/2017 | |
| CN | 206639852 U | | 11/2017 | |
| CN | 206976456 | * | 2/2018 | ......... H01M 50/204 |
| CN | 206976456 U | | 2/2018 | |
| CN | 207199696 U | | 4/2018 | |
| CN | 207459019 U | | 6/2018 | |
| CN | 108346814 | * | 7/2018 | ......... H01M 8/2475 |
| CN | 108346814 A | | 7/2018 | |
| CN | 207800727 U | | 8/2018 | |
| CN | 108878702 A | | 11/2018 | |
| CN | 108963122 A | | 12/2018 | |
| CN | 109613844 A | | 4/2019 | |
| CN | 109671889 | * | 4/2019 | ........... H01M 50/20 |
| CN | 109671889 A | | 4/2019 | |
| CN | 209249527 U | | 8/2019 | |
| CN | 209401701 U | | 9/2019 | |
| CN | 209496931 U | | 10/2019 | |
| CN | 211017197 U | | 7/2020 | |
| DE | 102010028194 A1 | | 10/2011 | |
| EP | 2485298 A1 | | 8/2012 | |
| EP | 2529781 A1 | | 12/2012 | |
| JP | 2019067669 A | | 4/2019 | |
| WO | 2010096197 A1 | | 8/2010 | |

OTHER PUBLICATIONS

First Office Action dated Jun. 2, 2021 received in Chinese Patent Application No. CN 201911411433.5.
First Notice of Review Observations dated Jun. 10, 2023 received in Chinese Patent Application No. CN 202210213349.8.
First Notice of Review Observations dated Jun. 30, 2023 received in Chinese Patent Application No. CN 202210214944.3.
Second Office Action dated Aug. 17, 2021 received in Chinese Patent Application No. CN 201911411433.5.

* cited by examiner

BATTERY MODULE, BATTERY PACK, DEVICE AND ASSEMBLY METHOD OF BATTERY MODULE

CROSS-REFERENCE TO RELATED APPLICATIONS

This application is a continuation of International Application No. PCT/CN2020/137077, filed on Dec. 17, 2020, which claims priority to Chinese Patent Application 201911411433.5, filed on Tuesday, Dec. 31, 2019 and entitled "BATTERY MODULE, BATTERY PACK, DEVICE AND ASSEMBLY METHOD FOR BATTERY MODULE". The disclosures of the aforementioned applications are hereby incorporated by reference in their entireties.

TECHNICAL FIELD

The present application relates to a technical field of energy storage devices, in particular, to a battery module, a battery pack, a device and an assembly method of the battery module.

BACKGROUND

A battery module includes a plurality of battery cells stacked upon one another, and when the battery module is grouped, each battery cell may be connected with each other by a cable tie. Compared with a frame structure, the cable tie has advantages of simple structure and low weight. In order to ensure stability and strength of the battery module, the current cable tie has the higher strength, however, under an action of an expansion force of the battery cell, deformation of the cable tie is small, so that an expansion force of the battery module cannot be released.

SUMMARY

The present application provides a battery module, a battery pack, a device and an assembly method of the battery module, a cable tie of the battery module has a higher connection reliability and can release an expansion force of the battery module.

A first aspect of embodiments of the present application provides a battery module, and the battery module includes:
a battery cell arrangement structure including a plurality of battery cells stacked upon one another;
a cable tie, the cable tie surrounding outside the battery cell arrangement structure, and at least including a first cable tie and a second cable tie of different materials;
where at least part of the first cable tie is located on a side of the second cable tie close to the battery cell.

In the embodiments of the present application, when at least part of the first cable tie is located inside the second cable tie, the first cable tie is closer to the battery cell arrangement structure than the second cable tie. In addition, the first cable tie and the second cable tie can be made of the different materials, so that a cable tie can have characteristics of the first cable tie and the second cable tie, which improves an applicability of the cable tie. In this case, it is helpful to improve a connection reliability of the cable tie to the battery cell arrangement structure, and to release an expansion force of the battery module.

It should be understood that the foregoing general description and the following detailed description are only exemplary, and cannot limit the present application.

REFERENCE SIGNS

Figure 1:
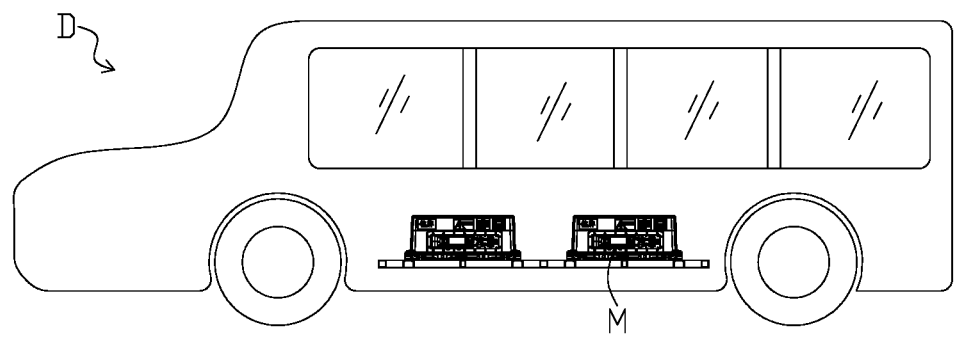
FIG. 1 is a schematic structural diagram of a device provided by the present application in a specific embodiment.

D—device; M—battery pack;
1—battery module; 11—battery cell arrangement structure; 111—battery cell; 12—cable tie; 121—first cable tie; 121a—first tie body; 121b—first connection area; 121c—bending structure; 122—second cable tie; 122a—second tie body; 122b—second connection area; 123—third cable tie; 13—end plate; 131—first mounting groove; 131a—first bottom wall; 131b—first upper side wall; 131c—first lower side wall; 132—second mounting groove; 132a—second bottom wall; 132b—second upper side wall; 132c—second lower side wall; 133—third mounting groove; 133a—third bottom wall; 133b—third upper side wall; 133c—third lower side wall; 134—fourth mounting groove; 134a—fourth bottom wall; 134b—fourth upper side wall; 134c—fourth lower side wall; 135—fitting portion; 135a—fifth bottom wall; 136—body portion; 137— step portion; 138—locking portion; 138a—mounting hole; 139—lower end surface;

2—box body; 21—cavity; 22—mounting beam.

The accompanying drawings, which are incorporated in and constitute a part of this specification, illustrate embodiments of the present application and, together with the description, serve to explain the principles of the present application.

DESCRIPTION OF EMBODIMENTS

To understand technical solutions of the present application better, a detailed description of embodiments of the present application will be given below in combination with the accompanying drawings.

It should be noted that embodiments described herein are merely a part, but not all, of the embodiments of the present application. All the other embodiments obtained by those of ordinary skill in the art based on the embodiments of the present application without any inventive effort shall fall within the scope of protection of the present application.

The terms used in the embodiments of this application are only intended to describe specific embodiments, but are not intended to limit this application. The terms of "a", "the", and "the foregoing" in singular forms used in the embodiments of this application and the appended claims are intended to include a plural form, unless other meanings are clearly indicated in a context.

It should be understood that the term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that the terms representing directions such as "up", "down", "left" and "right" described in the embodiments of the present application are described from the angles shown in the accompanying drawings, and should not be understood as limitation on the embodiments of the present application. In addition, in the context, it should also be understood that when it is mentioned that an element is connected "up" or "down" the other element, it can not only be directly connected "up" or "down" the other element, but also be indirectly connected "up" or "down" the other element through an intermediate element.

The embodiments of the present application provides a device D, a battery pack M and a battery module 1 using a battery cell 111 as a power, where the device D using the battery cell 11 as the power includes such mobile equipment as vehicles, ships and small airplanes. The device D includes a power source for providing a driving force to the device D, and the power source may be configured as the battery module 1 that provides electrical energy to the device D. Specifically, the driving force of the device D may be all the electrical energy, and may also include the electrical energy and other energy sources (such as mechanical energy). The power source may be the battery module 1 (or the battery pack M), and may also be the battery module 1 (or the battery pack M) and an engine, etc. Therefore, any device D that can use the battery cell 111 as the power is within a protection scope of the present application.

FIG. 1 is a schematic structural diagram of a device provided by the present application in a specific embodiment.

As shown in FIG. 1, taking a vehicle as an example, the device D according to the embodiments of the present application may be a new energy vehicle, where the vehicle may include the battery pack M and a vehicle body, and the battery pack M is arranged in the vehicle body.

Figure 2:
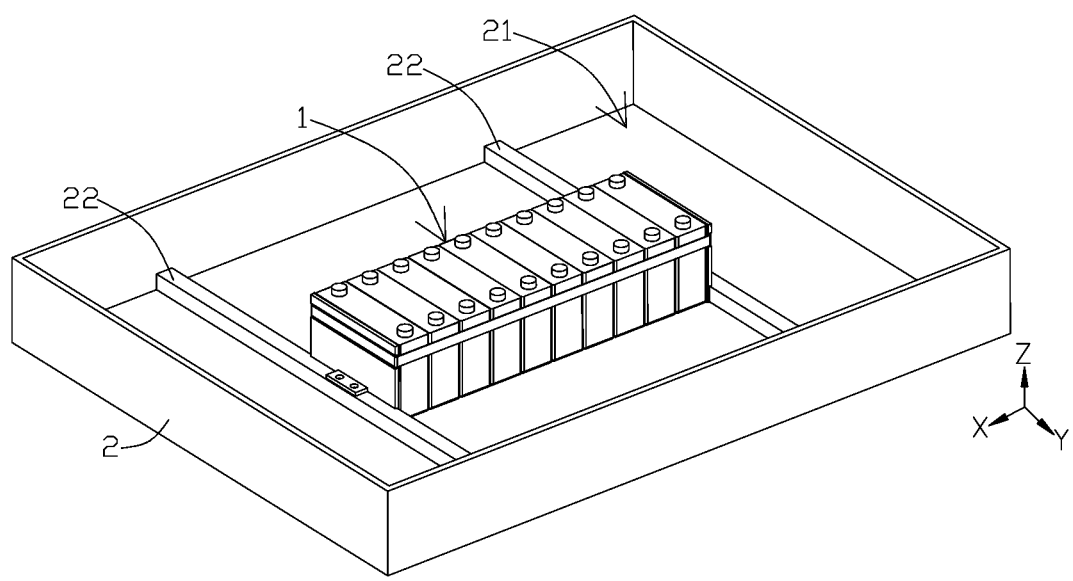
FIG. 2 is a partial schematic structural diagram of a battery pack provided by the present application in a specific embodiment.

FIG. 2 is a partial schematic structural diagram of a battery pack provided by the present application in a specific embodiment.

As shown in FIG. 2, the battery pack M includes a box body 2 and the battery module 1 of the present application, where the box body 2 has a cavity 21, and the battery module 1 is accommodated in the cavity 21. The number of the battery module 1 may be one or more, and multiple battery modules 1 are arranged in the cavity 21.

Figure 3:
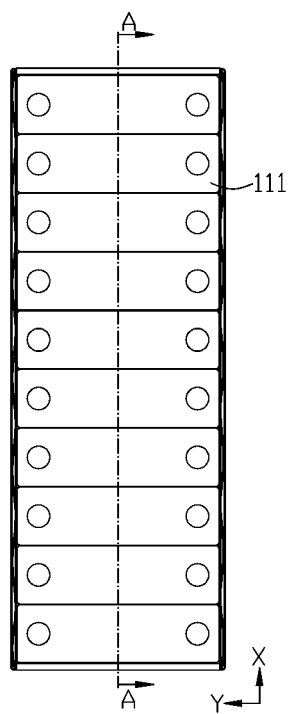
FIG. 3 is a top view of a battery module in FIG. 2 in a first specific embodiment.
Figure 4:
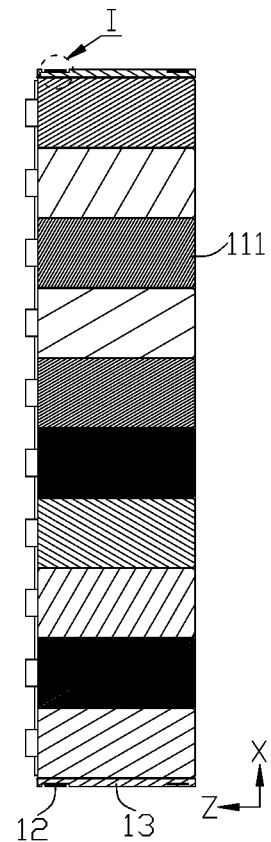
FIG. 4 is a cross-sectional view of an A-A direction in FIG. 3.

FIG. 3 is a top view of a battery module in FIG. 2 in a first specific embodiment, and FIG. 4 is a cross-sectional view of an A-A direction in FIG. 3;

More specifically, as shown in FIGS. 2 and 3, the battery module 1 includes a plurality of battery cells 111 and a frame structure for fixing the battery cells 111, where the plurality of battery cells 111 are stacked upon one another in a length direction X, and form a battery cell arrangement structure 11. The frame structure may include an end plate 13, and the end plate 13 is located at an end of the battery cell arrangement structure 11 in the length direction X. In a specific embodiment, the frame structure may further include a side plate (not shown), two side plates are located on two sides of the battery cell arrangement structure 11 in a width direction Y, and the side plate is connected with the end plate 13, so as to form the frame structure. In another embodiment, as shown in FIG. 4, the frame structure may not be provided with the side plate, the battery cells 111 are connected with each other through a cable tie 12 after being stacked. At this time, the end plate 13 and the cable tie 12 form the above frame structure.

When the frame structure of the battery module 1 includes the end plate 13 and the cable tie 12, generally, the cable tie 12 may be specifically made of metal or plastic material. When the cable tie 12 is made of the metal material, it has high tensile strength, and has a higher connection reliability to the battery cell arrangement structure 111. However, the metal cable tie 12 is hard to be elastically deformed, when the battery cell arrangement structure 11 is grouped into the battery module 1, the cable tie 12 has a small deformation amount, which is not easy to achieve a pre-tension of the battery cell arrangement structure 11. When the cable tie 12 is made of the plastic material, it is easy to be elastically deformed. When the cable tie 12 surrounds periphery of the cell arrangement structure 11, tension may be first applied to the cable tie 12 so that the cable tie 12 is in a stretched state. After the surrounding is completed, the battery cell arrangement structure 11 may be tightened under an action of a resilient force of the cable tie 12, so as to achieve the pre-tension. However, the plastic cable tie 12 has the lower tensile strength, and when the battery cell 111 in the battery module 1 expands, there is a risk that the cable tie 12 may be broken under an expansion force, thereby reducing the connection reliability and affecting a normal operation of the battery module 1.

On the basis of this, neither the metal cable tie 12 nor the plastic cable tie 12 can achieve the higher tensile strength while being able to release the expansion force of the battery cell 111. The embodiments of the present application improve the tensile strength of the cable tie 12 by changing the structure therefore, and release the expansion force of the battery cell 111.

Figure 5:
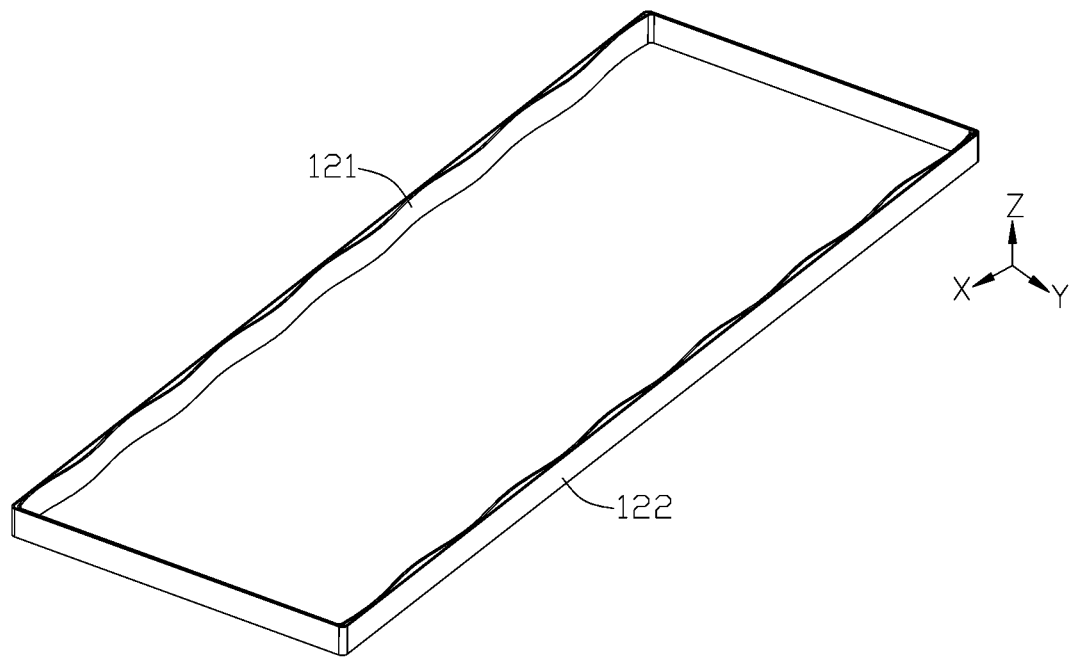
FIG. 5 is a schematic structural diagram of a cable tie in FIG. 4, where a first cable tie is in a relaxed state.

FIG. 5 is a schematic structural diagram of a cable tie in FIG. 4, where a first cable tie is in a relaxed state;

Specifically, as shown in FIG. 5, the cable tie 12 may be specifically a tie-like structure and surround outside the battery cell arrangement structure 11, and the cable tie 12 at least includes a first cable tie 121 and a second cable tie 122 of different materials, where at least part of the first cable tie 121 is located on a side of the second cable tie 122 close to the battery cell 111, that is, at least part of the first cable tie 121 is located inside the second cable tie 122, where the inside refers to a side close to the battery cell arrangement structure 11, and the outside refers to a side far away from the battery cell arrangement structure 11.

Therefore, as shown in FIG. 5, in this embodiment, when at least part of the first cable tie 121 is located inside the second cable tie 122, the first cable tie 121 is closer to the battery cell arrangement structure 11 than the second cable tie 122. In addition, the first cable tie 121 and the second cable tie 122 may be made of different materials, so that the cable tie 12 can have different characteristics, which improves an applicability of the cable tie 12, performance of the cable tie 12, and the connection reliability of the cable tie 12 to the battery cell 111.

Specifically, the tensile strength of the first cable tie 121 can be greater than that of the second cable tie 122, where the tensile strength (or a strength limit) indicates the maximum stress value of the material before it is broken. Therefore, the greater the tensile strength, the greater bearing capacity of the material, that is, the material is not easy to be destroyed under an action of a same external force. In this embodiment, compared with the second cable tie 122, the cable tie 121 located inside has the higher strength.

In this case, an elastic modulus of the first cable tie 121 is greater than that of the second cable tie 122, where according to Hooke's law, stress and strain of the material become proportional in an elastic deformation stage. Specifically, a proportional coefficient of the proportional relationship is the elastic modulus, and the elastic modulus is used to measure an ability of the material to resist elastic deformation. Therefore, the greater the elastic modulus, the great the stress required to make the material elastically deform, and the greater stiffness of the material (the harder to be elastically deformed), that is, when the stress is the same, the greater the elastic modulus, the smaller the elastic deformation. Therefore, in this embodiment, compared with the second cable tie 122, the first cable tie 121 located inside is much harder to be elastically deformed.

In summary, in the cable tie 12, the first cable tie 121 located inside has the higher strength and is hard to be elastically deformed, while the second cable tie 122 located outside has the lower strength and is easy to be elastically deformed. Therefore, when the cable tie 12 including the first cable tie 121 and the second cable tie 122 is applied to the battery module 1 in the embodiments of the present application, since the second cable tie 122 is easy to be elastically deformed, the pre-tension of the battery module 1 can be implemented during grouping of the battery cell 111. In this case, when the battery cell 111 expands during an operation of the battery module 1, since the first cable tie 121 has the higher strength, a risk of the cable tie 12 being damaged under an action of the expansion force can be reduced, so that the cable tie 12 still has the higher connection reliability to the expanded battery module 1, thereby improving the performance of the cable tie 12 and increasing a service life of the battery module 1.

More specifically, the first cable tie 121 may be made of the metal material, and the second cable tie 122 may be made of the plastic material. It can be understood that the tensile strength of the metal first cable tie 121 is greater than that of the plastic second cable tie 122. In this case, the elastic modulus of the metal first cable strap 121 is greater than that of the plastic second cable tie 122.

In this embodiment, when the battery cell 111 is grouped, the second cable tie 122 with a good elastic deformation ability is used to achieve the pre-tension of the battery cell arrangement structure 11, which improves the connection reliability of the cable tie 12 to the battery cell arrangement structure 11 when the battery cell 111 is grouped, and improves grouping efficiency. In this case, when the battery cell 111 expands, the first cable tie 121 with the higher strength prevents the cable tie 12 being damaged, which improves the connection reliability of the cable tie 12 to the battery cell arrangement structure 11 when the battery cell 111 expands.

For example, the material of the first cable tie 121 may be specifically metals such as stainless steel, aluminum, carbon steel, and the material of the second cable tie 122 may be specifically non-metals such as PET (polyester) plastic.

In a possible design, as shown in FIG. 5, at least part of the first cable tie 121 is abutted with the second cable tie 122 in a height direction Z of the battery module 1, that is, in the height direction Z, the first cable tie 121 and the second cable tie 122 have overlapping parts, and the two are abutted with each other at an overlapping position. When there is a relative movement between the first cable tie 121 and the second cable tie 122, a position where the two are abutted with each other has frictional resistance, thereby reducing a tendency of the relative movement between the two.

When the battery cell 111 in the battery module 1 is not expanded, a force between the cable tie 12 and the battery cell arrangement structure 11 is relatively small, and in the height direction Z, a gravity of the metal first cable tie 121 is relatively large, that is, the first cable tie 121 has a tendency to move downward relative to the second cable tie 122. In this embodiment, the two are abutted with each other to generate friction, which can reduce a risk of the first cable tie 121 and/or the second cable tie 122 falling off, and improve the connection reliability of the cable tie 12 to the battery cell arrangement structure 11 when the battery cell 111 is not expanded.

Figure 6:
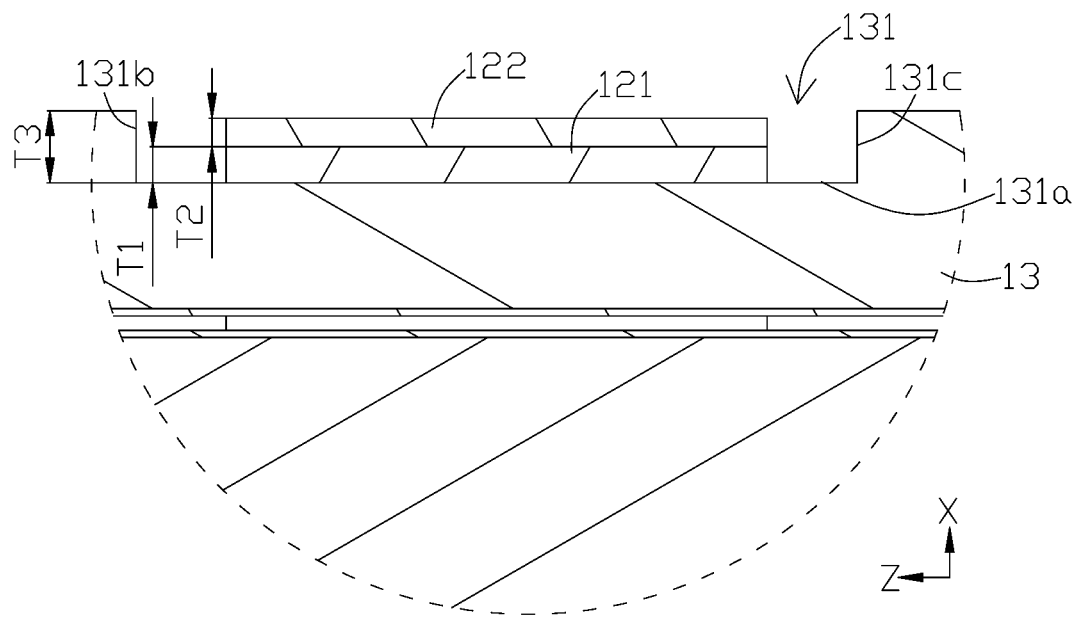
FIG. 6 is a partial enlarged view of part I in FIG. 4 in an embodiment.
Figure 7:
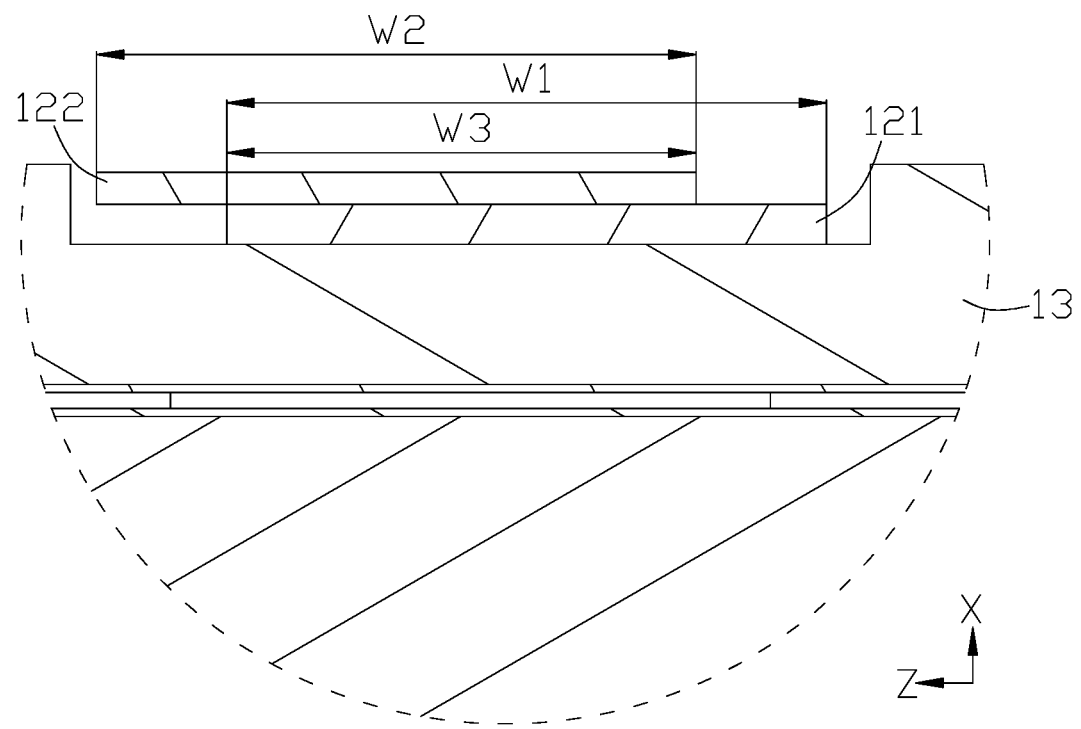
FIG. 7 is a partial enlarged view of part I in FIG. 4 in another embodiment.

FIG. 6 is a partial enlarged view of part I in FIG. 4 in an embodiment, and FIG. 7 is a partial enlarged view of part I in FIG. 4 in another embodiment;

Specifically, as shown in FIGS. 6 and 7, the first cable tie 121 has a first width W1, the second cable tie 122 has a second width W2. Among them, taking the first cable tie 121 as an example, the first cable tie 121 has three dimensions: length, width and thickness. And in the first cable tie 121 of the tie-like structure, the dimension with a largest value indicates the length of the first cable tie 121 (that is, a perimeter of the first cable tie 121), the dimension with a smallest value indicates the thickness of the first cable tie 121, and the dimension with a value between the maximum and minimum indicates the width of the first cable tie 121. Based on a perspective shown in FIGS. 6 and 7, the first width W1 of the first cable tie 121 refers to the dimension in the direction Z of the battery module 1.

In a specific embodiment, W1≤W2, that is, the width of the first cable tie 121 is less than or equal to that of the second cable tie 122. In the height direction Z, an abutting height of the second cable tie 122 and the first cable tie 121 is W3, where W3≥½W1, that is, the abutting height of the first cable tie 121 and the second cable tie 122 is greater than or equal to half of the width of the smaller one.

In an embodiment shown in FIG. 6, in the height direction Z, the first width W1 of the first cable tie 121 and the second width W2 of the second cable tie 122 are equal, and the two completely overlap in the height direction Z, that is, the two are not staggered from each other, so that the abutting height of the two is W3=W1=W2. At this time, an abutting area between the two is the largest. When the first cable tie 121 moves relative to the second cable tie 122, the fraction between the two is relatively large, so that a risk of the first cable tie 121 and/or the second cable tie 122 falling off can be reduced.

In an embodiment shown in FIG. 7, in the height direction Z, the first cable tie 121 and the second cable tie 122 are partially overlapped, that is, there is a staggered part between the two in the height direction Z. At this time, the abutting height of the two is W3<W1 and W3<W2. When W1≤W2, W3≥½W1, the first cable tie 121 and the second cable tie 122 can have a relatively large abutting area in the height direction Z, so that a risk of the first cable tie 121 and/or the second cable tie 122 falling off can be reduced.

In a possible design, as shown in FIGS. 4-7, two end plates 13 of the battery module 1 are located at two ends of the battery cell arrangement structure 11 in the length direction X, and the cable tie 12 is used to tightly fasten the two end plates 13 and the battery cell arrangement structure 11. Specifically, as shown in FIGS. 6 and 7, the end plate 13 is provided with a first mounting groove 131. In the height direction Z, a part of the first cable tie 121 (refers to a part of the first cable tie 121 in the width direction) and a part of the second cable tie 122 (refers to a part of the second cable tie 122 in the width direction) are located in the first mounting groove 131, and the first cable tie 121 and the second cable tie 122 are at least partially abutted with each other in the first mounting groove 131.

In this embodiment, as shown in FIG. 6, in the length direction X, the first mounting groove 131 has a first bottom wall 131a. When a part of the first cable tie 121 and a part of the second cable tie 122 are located in the first mounting groove 131, the first cable tie 121 located inside is abutted with the first bottom wall 131a. In this case, in the height direction Z, the first mounting groove 131 has a first upper side wall 131b and a first lower side wall 131c arranged opposite to each other. And in the height direction Z, a part of the first cable tie 121 and a part of the second cable tie 122 are both located between the first upper side wall 131b and the first lower side wall 131c.

In a specific embodiment, in the height direction Z, the second cable tie 122 may be abutted with both the first upper side wall 131b and the second lower side wall 131c. In this case, when the first width W1 of the first cable tie 121 is smaller than the second width W2 of the second cable tie 122, at least one end of the first cable tie 121 in the height direction is not abutted with a side wall of the first mounting groove 131. When the first width W1 of the first cable tie 121 is equal to the second width W2 of the second cable tie 122, in the height direction Z, the first cable tie 121 may be abutted with both the first upper side wall 131b and the second lower side wall 131c. Or the first cable tie 121 and the second cable tie 122 may not be abutted with the side wall of the first mounting groove 131.

In this embodiment, by arranging the first mounting groove 131 on the end plate 13, the first upper side wall 131b and the second lower side wall 131c of the first mounting groove 131 can restrict the movement of the cable tie 12 in the height direction Z, so as to improve the connection reliability of the cable tie 12 and the end plate 13.

Specifically, as shown in FIG. 6, in the length direction X of the battery module 1 (that is, in a thickness direction of the end plate 13), the depth of the first mounting groove 131 is T3, the thickness of the first cable tie 121 is T1, and the thickness of the second cable tie 122 is T2, where T1+T2≤T3≤T1+T2+1 millimeter (mm).

In this embodiment, the depth T3 of the first mounting groove 131 is greater than a sum of thicknesses of the first cable tie 121 and the second cable tie 122, so that the cable tie 12 does not increase the dimension of the battery module 1 in the length direction X after it is arranged, which is conducive to a spatial arrangement of the battery module 1. In this case, the depth of the first mounting groove 131 should not be too large (not greater than T1+T2+1 mm), so as to avoid that the strength of the end plate 13 at a position where the first mounting groove 131 is provided is too low due to the excessive depth of the first mounting groove 131, which increases a service life of the end plate 13.

Figure 8:
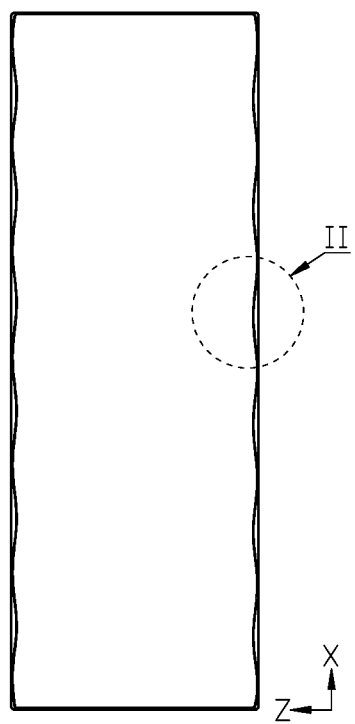
FIG. 8 is a top view of FIG. 5.
Figure 9:
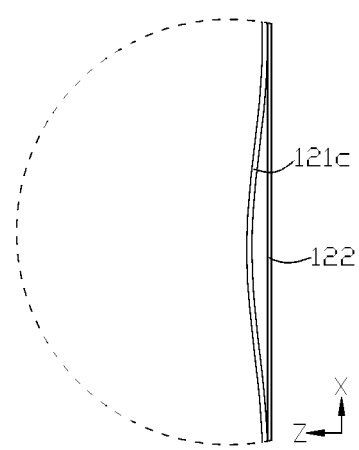
FIG. 9 is a partial enlarged view of part II in FIG. 8.

FIG. 8 is a top view of FIG. 5, and FIG. 9 is a partial enlarged view of part II in FIG. 8.

On the other hand, as shown in FIGS. 8 and 9, the first cable tie 121 located inside may further include a bending structure 121c. Therefore, when the first cable tie is stressed, the bending structure 121c can be deformed.

In this embodiment, the first cable tie 121 is located inside (closer to the battery cell 111 compared with the second cable tie 122), and the tensile strength and elastic modulus thereof are both relatively large (such as the metal cable tie). When the battery cell 111 of the battery module 1 expands, the bending structure 121c of the first cable tie 121 can be deformed under the action of the expansion force, so that the first cable tie 121 can release the expansion force of the battery cell 111, which improves safety and increases the service life of the battery module 1. And the first cable tie 121 can also adapt to the deformed battery cell arrangement structure 11, so that the cable tie 12 can be applied to battery modules 1 of different dimensions.

Figure 10:
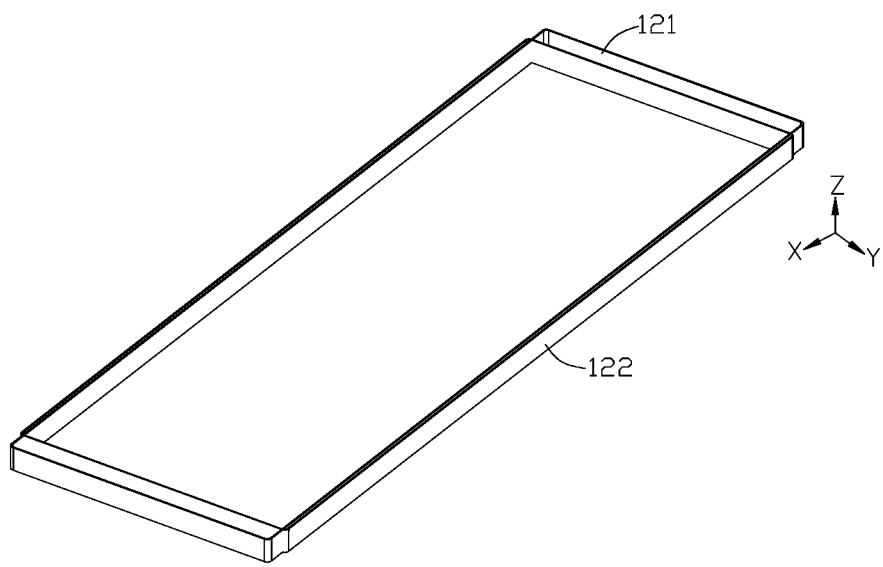
FIG. 10 is a schematic structural diagram of the cable tie in FIG. 4, where the first cable tie is in a tension state.
Figure 11:
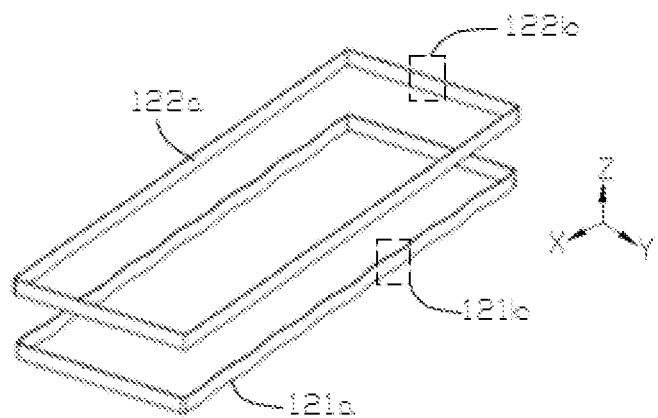
FIG. 11 is an exploded view of FIG. 5.

FIG. 10 is a schematic structural diagram of the cable tie in FIG. 4, where the first cable tie is in a stretched state, and FIG. 11 is an exploded view of FIG. 5.

In a specific embodiment, as shown in FIGS. 5, 8 and 11, the first cable tie 121 may be an annular wave structure, that is, the first cable tie 121 may include a plurality of the bending structures 121c, and at least two bending structures 121c have opposite bending directions. In this case, each bending structure 121c is an arc structure, and adjacent bending structures 121c are in a circular arc transition to form the first cable tie 121 of the wave structure. Moreover, in this embodiment, the wave structure of the first cable tie 121 may be formed by stamping during processing.

In this embodiment, the first cable tie 121 is the wave structure, which means that the first cable tie 121 is wavy when the battery cell 111 is not significantly expanded (the first cable tie 121 is not significantly deformed), or the first cable tie 121 is formed into the wave structure by processing (when it does not surround the battery cell arrangement structure 11). When the first cable tie 121 surrounds the battery cell arrangement structure 11, the battery cell 111 expands, and when the expansion force makes the deformation amount of the battery cell arrangement structure 11 small, the deformed battery cell arrangement structure 11 first acts on the second cable tie 122 located outside after the battery cell arrangement structure 11 is deformed, so that the second cable tie 122 is elastically stretched, so as to release the small expansion force and improve the connection reliability of the cable tie 12 to the expanded battery cell arrangement structure 11. At this time, the first cable tie 121 is in the relaxed state.

When the expansion force of the battery cell 111 makes the deformation amount of the battery cell arrangement structure 11 large, in addition to the second cable tie 122 with the higher elastic deformation ability can be elastically deformed, the first cable tie 121 of the wave structure can also be deformed, so that at least part of the wave structure is straightened and the first cable tie 121 is in a tightened state. Specifically, in this state, the deformation of the first cable tie 121 refers to a change in shape of the first cable tie 121 (the wave shape is straightened into a rectangle), not the deformation of the material of the first cable tie 121. Of course, when the expansion force is larger, the material of the first cable tie 121 can also be deformed to a certain extent. At this time, the first cable tie 121 is completely straightened into the rectangle, a state shown in FIG. 10. In this case, since the first cable tie 121 has the relatively high tensile strength, when the larger expansion force is released, a risk of the cable tie 12 being broken under the action of the expansion force can be reduced. And during the deformation of the first cable tie 121, the dimension of the battery cell arrangement structure 11 increases, and the second cable tie 122 can be elastically deformed so as to adapt to the battery cell arrangement structure 11, and to apply the pre-tension to the battery cell arrangement structure 11.

In another specific embodiment, the length of the first cable tie 121 is greater than a perimeter of the battery cell arrangement structure 11, and the length of the first cable tie 121 is greater than that of the second cable tie 122. As described above, the length of the first cable tie 121 of an annular structure refers to the perimeter of the first cable tie 121. And when the second cable tie 122 surrounds outside the first cable tie 121, the second cable tie 122 with the relatively small length can apply a squeezing force to the first cable tie 121 with the relatively large length, so that the first cable tie 121 forms one or more bending structures 121*c*, and each bending structure 121*c* can be deformed when the first cable tie 121 is stressed.

In this embodiment, the first cable tie 121 and the second cable tie 122 can both be formed into rectangular structures that can surround outside the battery cell arrangement structure 11 during processing, and the perimeter of the first cable tie 121 is greater than that of the second cable tie 122. When the two surround the outside the battery cell arrangement structure 11, the second cable tie 122 with the relatively small perimeter located outside can apply the squeezing force to the first cable tie 121 with the relatively large perimeter located inside, so as to form the bending structure 121*c* in the first cable tie 121.

In this embodiment, the first cable tie 121 and the second cable tie 122 surround outside the battery cell arrangement structure 11, and when the expansion force of the battery 111 makes the deformation amount of the battery cell arrangement structure 11 large, the bending structure 121*c* in the first cable tie 121 formed by squeezing can also be deformed, where the deformation of the bending structure 121*c* also refers to the change in the shape, that is, under the action of the expansion force, the bending structure 121*c* is gradually stretched into a linear structure until the first cable tie 121 including a plurality of the bending structures 121*c* is straightened into a rectangular structure. Of course, when the expansion force continues to increase, the material of the first cable tie 121 may also be deformed to a certain extent.

Therefore, a specific formation mode of the bending structure 121*c* is not limited, as long as the first cable tie 121 includes the bending structure 121*c* that can be deformed.

In a possible design, as shown in FIG. 11, the first cable tie 121 and the second cable tie 122 are annular structures that can surround the battery cell arrangement structure 11, and the two are specifically formed into the annular structure through the tie-like structure. Specifically, the first cable tie 121 is formed by a first tie body 121*a*, and two end positions of the first tie body 121*a* are connected to form the first cable tie 121, and a first connection area 121*b* is formed at a junction, where two connection positions of the first cable tie 121*a* need to be able to surround the battery cell arrangement structure 11 after being connected to form the first cable tie 121. Likewise, the second cable tie 122 is formed by a second tie body 122*a*, and two end positions of the second tie body 122*a* are connected to form the second cable tie 122, and a second connection area 122*b* is formed at a junction, where two connection positions of the second tie body 122*a* need to be able to surround the battery cell arrangement structure 11 after being connected to form the second cable tie 122.

In this embodiment, after being stressed, the first cable tie 121 is easily broken in the first connection area 121*b*, and the second cable tie 122 is easily broken in the second connection area 122*b*, that is, two connection areas are weak areas of two cable ties.

As shown in FIG. 11, the first connection area 121*b* of the first cable tie 121 and the second connection area 122*b* are staggered from each other, that is, the weak areas of the two cable ties are staggered from each other, so as to reduce a risk of disconnecting of both connection areas under the action of the expansion force, which increases the service life and improves the connection reliability of the cable tie 12.

Specifically, one of the first connection area 121*b* and the second connection area 122*b* is located at an end of the battery cell arrangement structure 11 in the length direction X, and the other is located at an end of the battery cell arrangement structure 11 in the width direction Y, so that the two connection areas are staggered from each other. Specifically, as shown in FIG. 11, the first connection area 121*b* of the first cable tie 121 is located at an end of the battery cell arrangement structure 11 in the width direction Y, and the second connection area 122*b* of the second cable tie 122 is located at an end of the battery cell arrangement structure 11 in the length direction X.

Additionally, the embodiments of the present application further provide an assembly method of the battery module 1, where the battery module 1 includes the battery cell arrangement structure 11 and the cable tie 12, the cable tie 12 surrounds outside the battery cell arrangement structure 11, and the cable tie 12 at least includes the first cable tie 121 and the second cable tie 122 of the different materials, where the assembly method of the battery module 1 includes the following steps:

S2: sleeving the first cable tie 121 outside the battery cell arrangement structure 11.

Specifically, the perimeter of the first cable tie 121 may be greater than that of the battery cell arrangement structure 11, so that the first cable tie 121 is in the relaxed state when it is sleeved outside the battery cell arrangement structure 11.

S3: surrounding the battery cell arrangement structure 11 with the second tie body 122*a* of the second cable tie 122, and the second tie body 122*a* surrounds the first cable tie 121, so that the second tie body 122*a* covers at least part of the first cable tie 121 in the height direction Z.

S4: connecting the second tie body 122a to form an annular second cable tie 122.

Specifically, the perimeter of the second cable tie 122 surrounded by the second cable tie 122a is smaller than that of the first cable tie 121, and the perimeter of the second cable tie 122 may be equal to or slightly smaller than that of the battery cell arrangement structure 11. At this time, the second cable tie 122 can implement the pre-tension to the battery cell arrangement structure 11 after surrounding the battery cell arrangement structure 11. Additionally, since the perimeter of the first cable tie 121 is greater than that of the second cable tie 122, the first cable tie 121 forms at least one bending structure 121c after the first cable tie 121 and the second cable tie 122 surround the battery cell arrangement structure 11. And the bending structure 121c can be deformed when the first cable tie 121 is stressed.

Additionally, in this embodiment, the first cable tie 121 may be specifically made of the material with the relatively large tensile strength and elastic modulus, and the second cable tie 122 may be specifically made of the material with the relatively small tensile strength and elastic modulus. For example, the first cable tie 121 may be specifically made of the metal material, and the second cable tie 122 may be specifically made of the plastic material. During assembly, the second cable tie 122 is located outside the first cable tie 121 through steps S3 and S4, and the pre-tension to the battery cell arrangement structure 11 can be implemented through the first cable tie 121 and the second cable tie 122. In this case, when the battery cell 111 expands, it can release the expansion force, and has the higher connection reliability to the expanded battery cell arrangement structure 11

In this embodiment, the first tie body 121a is welded to form the first cable tie 121, and then the first cable tie 121 is sleeved outside the battery cell arrangement structure 11, there is no need to weld the first tie body 121a after it is connected with the battery cell arrangement structure 11, so as to avoid damaging the battery cell 111 when welding the first tie body 121a, which improves the safety and increases the service life of the battery module 1.

Specifically, the first cable tie 121 includes the first tie body 121a, that is, the first cable tie 121 is formed by the first tie body 121a. Before step S2, the assembly method may further include:

S1: welding the first tie body 121a to form the annular first cable tie 121.

In this embodiment, the first cable tie is made of the metal material. Therefore, when the first tie body 121a is used to form the first cable tie 121, welding can be used, and during forming, two positions of the first tie body 121a are welded to form the annular structure. Moreover, two welding positions can be selected according to the specific length of the first tie body 121a, as long as the first cable tie 121 can surround the battery cell arrangement structure 11 and the perimeter of the first cable tie 121 is greater than that of the second cable tie 122.

Or the cable tie 121a with the length of the perimeter of the first cable tie 121 may be selected first, and then the first tie body 121a is welded and connected end to end to form the annular first cable tie 121. Specifically, laser welding, resistance welding and other ways may be adopted. Or when the length of the first tie body 121a is greater than the perimeter of the first cable tie 121, after the two positions of the first tie body 121a are welded to form the annular structure, the annular structure is also connected with excess tie heads (not involved in forming the annular structure). At this time, part of the tie heads may be removed from the annular structure (for example, by means of cutting), so as to form the first cable tie 121.

More specifically, the second tie body 122a may be specifically made of the plastic material. Based on this, the step S4 may be specifically:

S41: connecting the second tie body 122a by hot-melting to form the annular second cable tie 122.

In this embodiment, during the process of thermally connecting the second tie body 122a to form the second cable tie 122, the second cable tie 122 can be stretched to apply pressure on the battery cell arrangement structure 11, so as to implement the pre-tension to the battery cell arrangement structure 11.

In the above embodiments, as shown in FIG. 2, in the height direction Z, one end of the battery cell arrangement structure 11 is fixedly connected with the box body 2, and the first cable tie 121 and the second cable tie 122 surround the other end of the battery cell arrangement structure 11.

Specifically, as shown in FIG. 2, bottom of the battery cell arrangement structure 11 is fixedly connected with that of the box body 2, and the two may specifically be bonded by structural glue or be connected by other means. Therefore, the first cable tie 121 and the second cable tie 122 surround an upper end of the battery cell arrangement structure 11, that is, an end far away from the box body 2, and a specific position of the first cable tie 121 and the second cable tie 122 fitted with the battery cell arrangement structure 11 can be set according to actual conditions, as long as it can implement the grouping and fixation of the battery module 1 through a fixed connection with the box body 2, and the first cable tie 121 and the second cable tie 122.

Additionally, the battery module 1 may only include an upper cable tie, and the upper cable tie includes the first cable tie 121 and the second cable tie 122 in the above embodiments. Or the battery module 1 may also include the upper cable tie and a lower cable tie, the upper cable tie includes the first cable tie 121 and the second cable tie 122 in the above embodiments, and the lower cable tie may be arranged at an end close to the bottom of the box body 2. The connection reliability between the cable tie 12 and the battery cell arrangement structure 11 can be improved through the upper cable tie and the lower cable tie.

Figure 12:
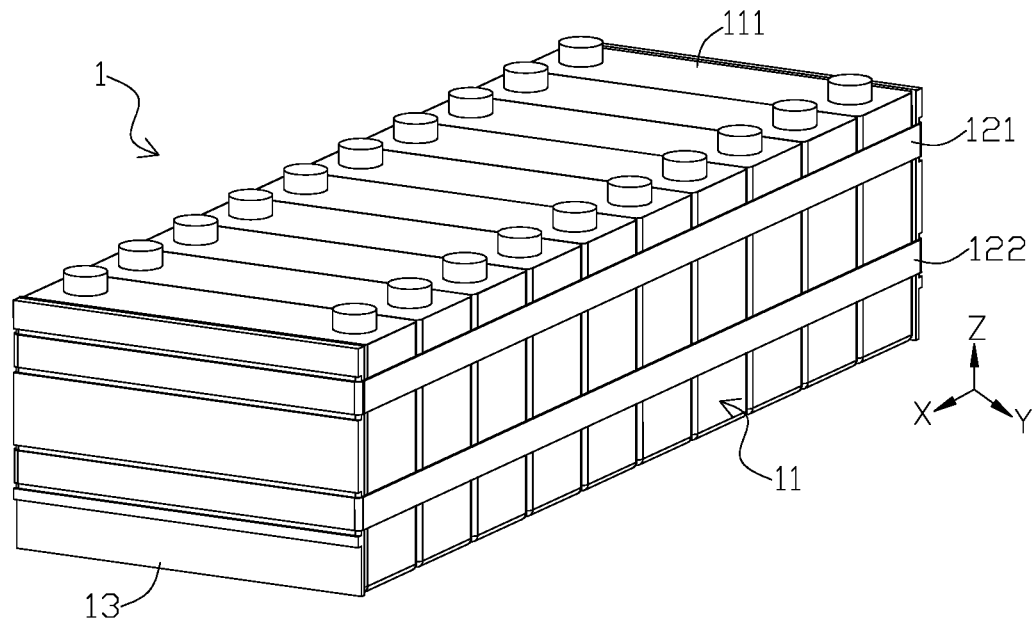
FIG. 12 is a schematic structural diagram of a battery module in FIG. 2 in a second specific embodiment.
Figure 13:
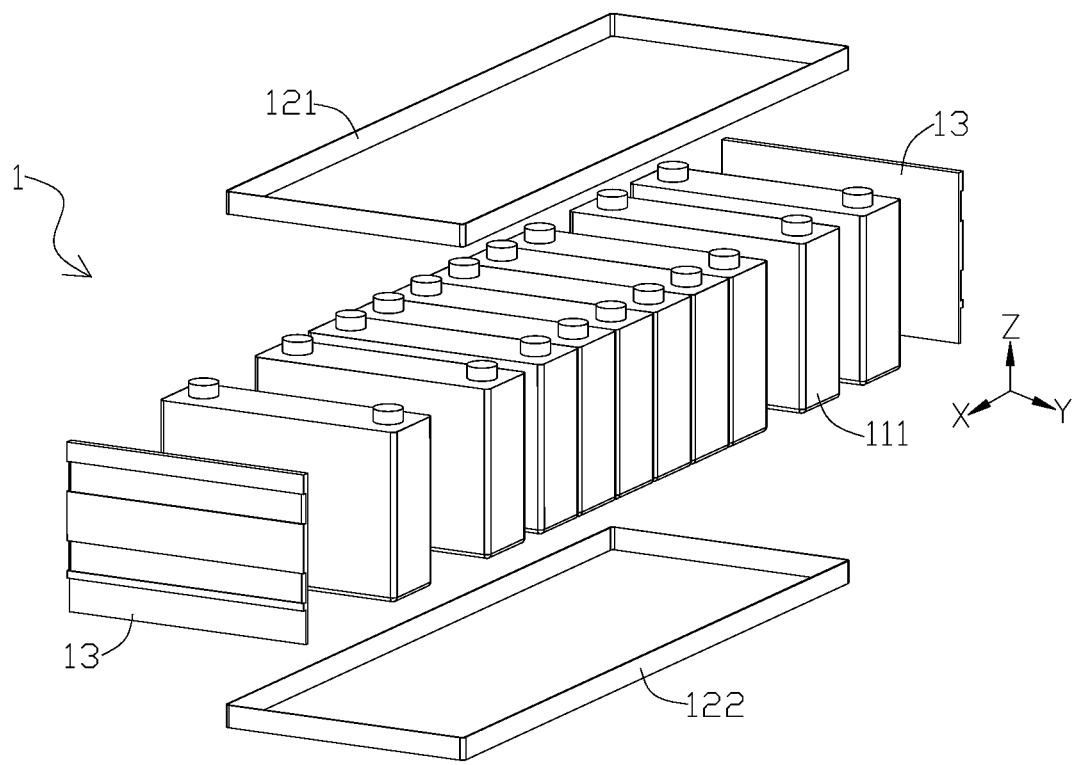
FIG. 13 is an exploded view of FIG. 12.
Figure 14:
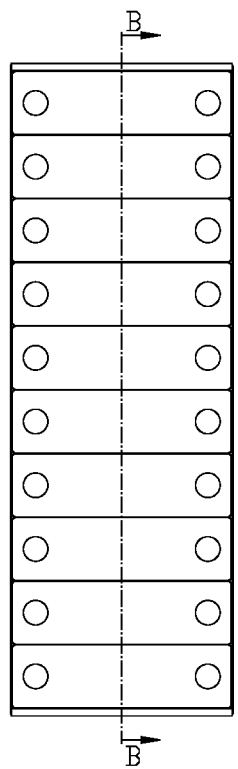
FIG. 14 is a top view of FIG. 12.
Figure 15:
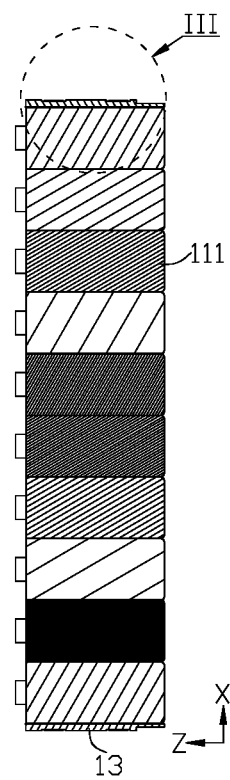
FIG. 15 is a cross-sectional view of a B-B direction in FIG. 14.

FIG. 12 is a schematic structural diagram of a battery module in FIG. 2 in a second specific embodiment, FIG. 13 is an exploded view of FIG. 12, FIG. 14 is a top view of FIG. 12, and FIG. 15 is a cross-sectional view of a B-B direction in FIG. 14.

In another possible design, in the embodiments shown in FIGS. 12, 13, 14 and 15, the battery pack M includes the first cable tie 121 and the second cable tie 122, where the first cable tie 121 and the second cable tie 122 surround outside the battery cell arrangement structure 11. Specifically, the tensile strength of the first cable tie 121 is greater than that of the second cable tie 122, and the elastic modulus of the first cable tie 121 is greater than that of the second cable tie 122, that is, the strength of the first cable tie 121 is greater than that of the second cable tie 122, while the deformation ability of the second cable tie 122 is greater than that of the first cable tie 121, On the basis of this, the first cable tie 121 and the second cable tie 122 are arranged in the height direction Z of the battery module 1, and the second cable tie 122 is close to an end fixedly connecting the battery module 1 and the box body 2, that is, the first cable tie 121 is far away from the end fixedly connecting the battery module 1 and the box body 2, where the battery module 1 and the box body 2 may be bonded by the structural glue, or the battery module 1 may be locked in the box body 2 by bolts.

In this embodiment, in the height direction Z, one end of the battery module 1 is fixedly connected with the box body 2. Therefore, a grouping reliability of each battery cell 111 is higher at this position, and a reliable grouping can be implemented by only setting the second cable tie 122 with the lower tensile strength. While with respect to an end not connecting the battery module 1 and the box body 2, the battery cell 111 needs to be grouped by a higher strength structure, that is, in this embodiment, the first cable tie 121 with the higher tensile strength is arranged at a position far away from the end fixedly connecting the battery module 1 and the box body 2, so that a grouping of the battery cells 111 at the position may be implemented by the first cable tie 121 with the higher strength, and efficiency of the grouping thereof is also improved.

In this case, when the battery cell 111 of the battery module 1 expands, a position of the cell arrangement structure 11 away from an end connected with the box body 2 expands and deforms greatly. Therefore, when the first cable tie 121 with the higher tensile strength is arranged at this position, a risk of the first tie 121 being broken under the action of the expansion force can be reduced.

Specifically, the first cable tie 121 may be specifically made of the metal material, and the second cable tie 122 may be specifically made of the plastic material. With respect to the first cable tie 121 and the second cable tie 122 with same volume, weight of the second cable tie 122 is smaller than that of the first cable tie 121.

Therefore, in this embodiment, cable ties with the different tensile strength are arranged according to different strength requirements of different positions, which can implement a grouping of the battery module 1 and has the higher grouping reliability. In this case, when the second cable tie 122 with the lower tensile strength is arranged at a position with the lower strength requirement, the weight of the battery module 1 can also be reduced, which improves an energy density thereof.

In summary, in this embodiment, the first cable tie 121 and the second cable tie 122 may be arranged at intervals in the height direction Z. Or in the embodiments shown in FIGS. 4 and 5, the first cable tie 121 and the second cable tie 122 of the different materials are approximately at a same height, and the first cable tie 121 is located inside the second cable tie 122.

Figure 16:
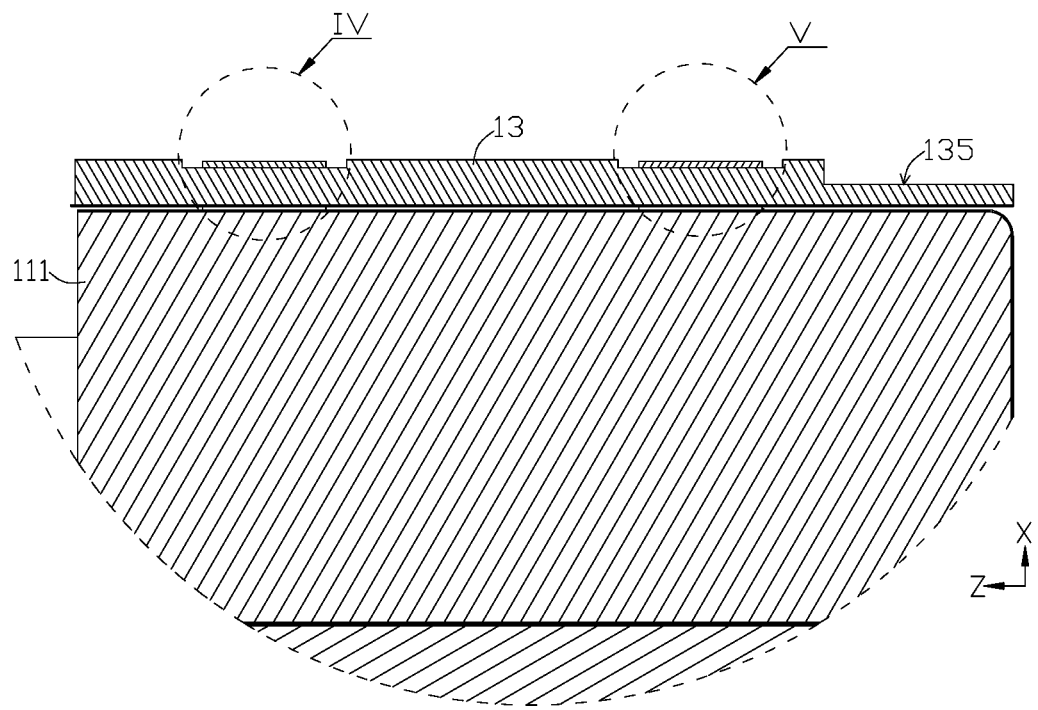
FIG. 16 is a partial enlarged view of part III in FIG. 15.
Figure 17:
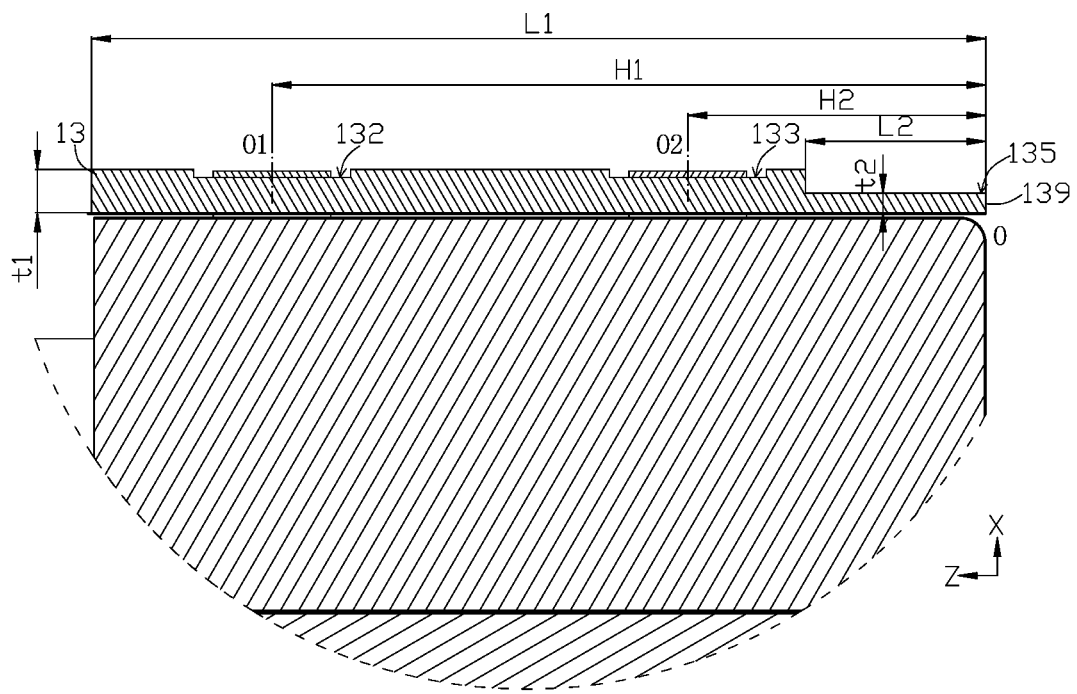
FIG. 17 is a dimensional relationship diagram of each component in FIG. 16.

FIG. 16 is a partial enlarged view of part III in FIG. 15, and FIG. 17 is a dimensional relationship diagram of each component in FIG. 16.

Specifically, as shown in FIGS. 16 and 17, the end plate 13 is provided with a second mounting groove 132 and a third mounting groove 133. In the height direction Z of the battery module 1, the second mounting groove 132 is located above the third mounting groove 133, where a part of the first cable tie 121 (refers to a part of the first cable tie 121 in the width direction) is located in the second mounting groove 132. In this case, a part of the second cable tie 122 (refers to a part of the second cable tie 122 in the width direction) is located in the third mounting groove 133.

Figure 18:
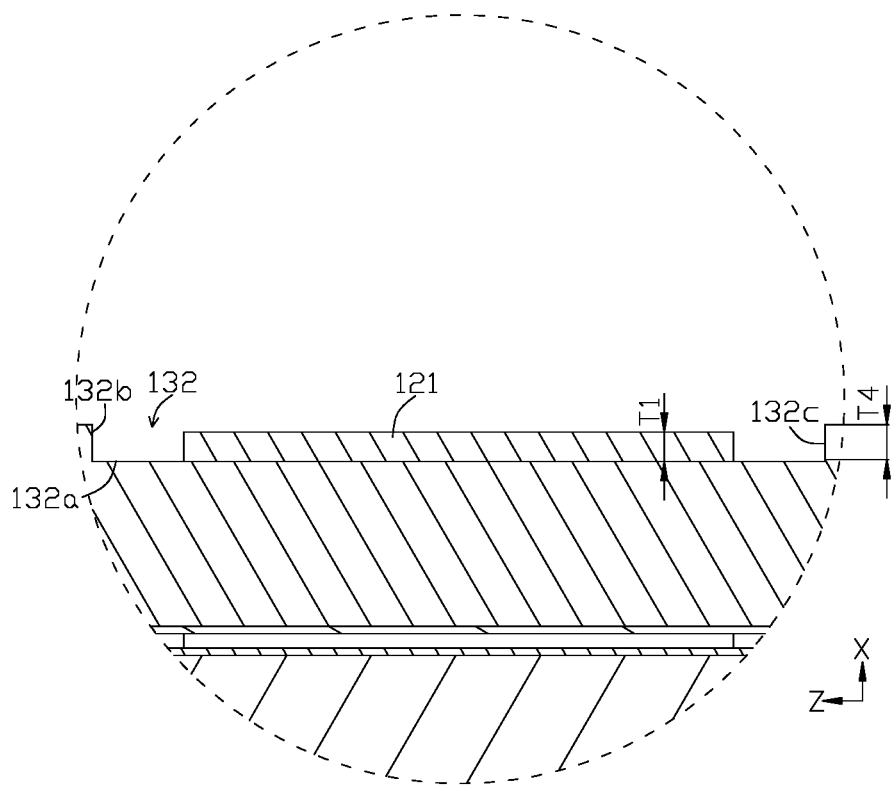
FIG. 18 is a partial enlarged view of part IV in FIG. 16.
Figure 19:
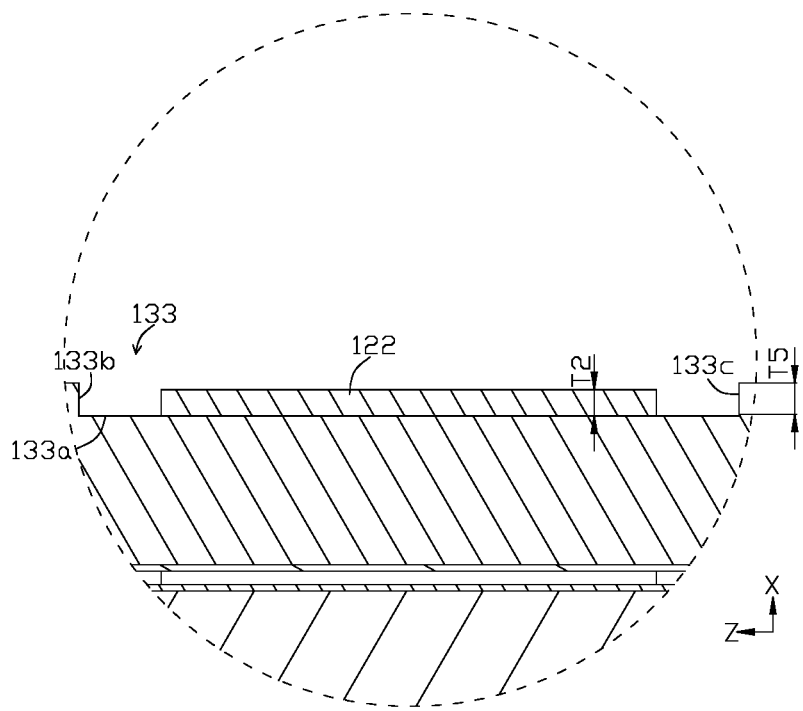
FIG. 19 is a partial enlarged view of part V in FIG. 16.

FIG. 18 is a partial enlarged view of part I in FIG. 16, and FIG. 19 is a partial enlarged view of part I in FIG. 16.

Specifically, as shown in FIGS. 18 and 19, in the length direction X of the battery module 1, the second mounting groove 132 has a second bottom wall 132a. When a part of the first cable tie 121 is located in the second mounting groove 132, the first cable tie 121 is abutted with the second bottom wall 132a. In this case, in the height direction Z, the second mounting groove 132 includes a second upper side wall 132b and a second lower side wall 132c arranged opposite to each other, and the first cable tie 121 is located between the second upper side wall 132b and the second lower side wall 132c. In this case, the first cable tie 121 may or may not be abutted with two side walls. Likewise, in the length direction X of the battery module 1, the third mounting groove 133 includes a third bottom wall 133a, when a part of the second cable tie 122 is located in the third mounting groove 133, the second cable tie 122 is abutted with the third bottom wall 133a. In this case, in the height direction Z, the third mounting groove 133 includes a third upper side wall 133b and a third lower side wall 133c arranged opposite to each other, and the second cable tie 122 is located between the third upper side wall 133b and the third lower side wall 133c. In this case, the second cable tie 122 may or may not be abutted with the two side walls.

In this embodiment, by arranging the second mounting groove 132 and the third mounting groove 133 on the end plate 13, the second upper side wall 132b and the second lower side wall 132c of the second mounting groove 132 can restrict the movement of the first cable tie 121 in the height direction Z, and the third upper side wall 133b and the third lower side wall 133c of the third mounting groove 133 can restrict the movement of the second cable tie 122 in the height direction Z, so as to improve the connection reliability between the first cable tie 121 and the second cable tie 122 and the end plate 13.

Specifically, as shown in FIGS. 18 and 19, in the length direction X, the depth of the second mounting groove 132 is T4, and the depth of the third mounting groove 133 is T5. The thickness of the first cable tie 121 is T1, and the thickness of the second cable tie 122 is T2, 0<T4−T1<0.5 mm, 0<T5−T2<0.5 mm.

In this embodiment, the depth T4 of the second mounting groove 132 is greater than the thickness T1 of the first cable tie 121, and the depth T5 of the third mounting groove 133 is greater than the thickness T2 of the second cable tie 122, so that the first cable tie 121 and the second cable tie 122 do not increase the dimension of the battery module 1 in the length direction X after they are arranged, which is conducive to the spatial arrangement of the battery module 1. In this case, the depth T4 of the second mounting groove 132 and the depth T5 of the third mounting groove 133 should not be too large (T4−T1<0.5 mm, T5−T2<0.5 mm), so as to avoid that the strength of the end plate 13 at a position where the second mounting groove 132 and the third mounting groove 133 are provided is too low due to the excessive depths of the second mounting groove 132 and the third mounting groove 133, which increases the service life of the end plate 13.

More specifically, as shown in FIG. 17, in the height direction Z, the second mounting groove 132 has a first centerline O1, and in the height direction Z, there is a first distance H1 between the first centerline O1 and a lower end surface 139 of the end plate 13. Likewise, in the height direction Z, the third mounting groove 133 has a second centerline O2, and in the height direction Z, there is a second distance H2 between the second centerline O2 and the lower end surface 139. In this case, the end plate 13 has a first height L1 in the height direction Z, where H1≥⅔L1, and L1≥H2≥¼L1.

In this embodiment, the first distance H1 can characterize a setting height of the second mounting groove 132 relative to the lower end surface 139 of the end plate 13. Likewise, the second distance H2 can characterize a setting height of the third mounting groove 133 relative to the end surface of the end plate 13. The battery module 1 is fixedly connected with the box body 2 at an end close to the lower end surface 139 of the end plate 13. Therefore, a setting position of the second mounting groove 132 is higher than that of the third mounting groove 133, that is, H1>H2.

In this case, after the end plate 13 is provided with the second mounting groove 132 and the third mounting groove 133 arranged in the height direction Z, different thicknesses of the end plate 13 makes the strength and stiffness of the end plate 13 are different. When H1≥⅔L1 and ¾L1≥H2≥¼L1, a distance between the second mounting groove and the third mounting groove is not too large or too small, so that when two mounting grooves are provided, a stress and a deformation of the end plate 13 are still relatively uniform.

Additionally, in the embodiments shown in FIGS. 16 and 17, the end plate 13 further includes a first fitting portion 136 and a second fitting portion 135, where the second mounting groove 132 and the third mounting groove 133 are arranged in the first fitting portion 136. And in the height direction Z, the second fitting portion 135 is located below the third mounting groove 133. At this time, the battery module 1 and the box body 2 can be bonded, and can also be connected through a mounting beam 22 and the end plate 13. In this case, the battery cell arrangement structure 11 of the battery module 1 is grouped through the first cable tie 121 and the second cable tie 122.

On the other hand, when the thickness of the end plate 13 of the battery module 1 is relatively small, structural strength cannot be met. Therefore, the end plate 13 is generally a flat structure with a certain thickness, so as to meet a strength requirement of the battery module 1. However, when the thickness of the end plate 13 is relatively large, the energy density of the battery module 1 is affected.

Figure 20:
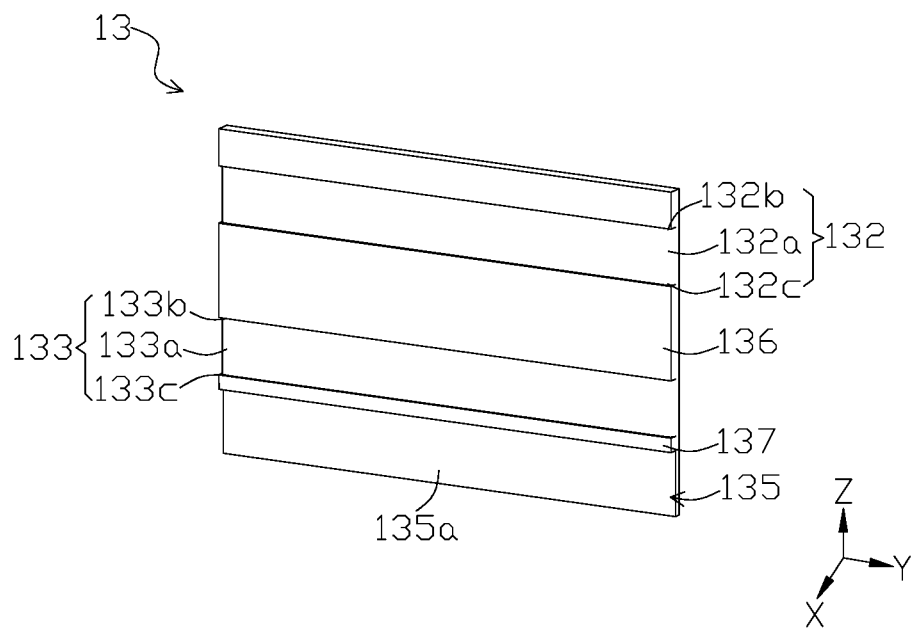
FIG. 20 is a schematic structural diagram of an end plate in FIG. 13.
Figure 21:
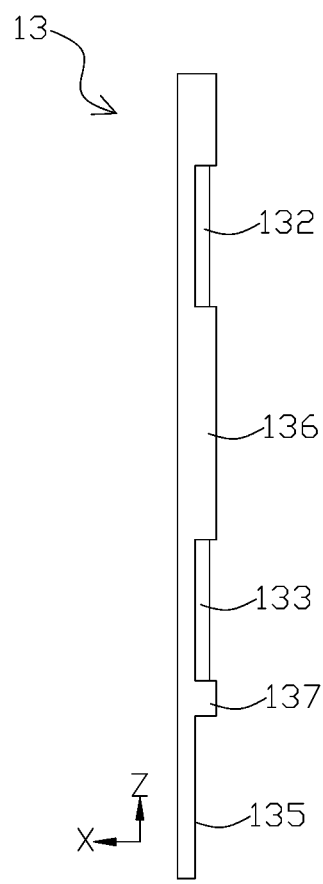
FIG. 21 is a side view of FIG. 20.

FIG. 20 is a schematic structural diagram of an end plate in FIG. 13, and FIG. 21 is a side view of FIG. 20.

In order to solve this technical problem, as shown in FIGS. 20 and 21, the end plate 13 of the battery module 1 may include the first fitting portion 136 and the second fitting portion 135, where in the height direction Z of the battery module 1, the second fitting portion 135 is located below the first fitting portion 136, and the thickness of the second fitting portion 135 is smaller than that of the first fitting portion 136. In this case, the battery module 1 is fixed in the box body 2 of the battery pack M, and the battery module 1 can be fitted and fixed with the box body 2 through the second fitting portion 135.

In this embodiment, the thicknesses of the first fitting portion 136 and the second fitting portion 135 of the end plate 13 are different, so that the end plate 13 is a structure with different thicknesses at different positions, so as to reduce the weight of the end plate 13 and improve the energy density of the battery module 1 while ensuring the higher strength of the end plate 13. Additionally, when thickness of the end plate 13 at different positions is not exactly the same and the battery module 1 is mounted in the box body 2, a fit between the end plate 13 and other parts in the box body 2 can also be easily implemented, which improves assembly efficiency.

Specifically, as shown in FIG. 2, the mounting beam 22 is arranged in the cavity 21 of the box body 2. In the length direction X of the battery module 1, the mounting beam 22 is located at an end of the battery cell arrangement structure 11. Therefore, the mounting beam 22 can restrict a movement of the battery cell arrangement structure 11 in the length direction X, which improves a mounting reliability of the battery module 1 in the battery pack 2. In this case, when the battery module 1 is mounted between two mounting beams 22, the end plates 13 are close to the two mounting beams 22, respectively, and are fitted with the mounting beams 22.

Figure 22:
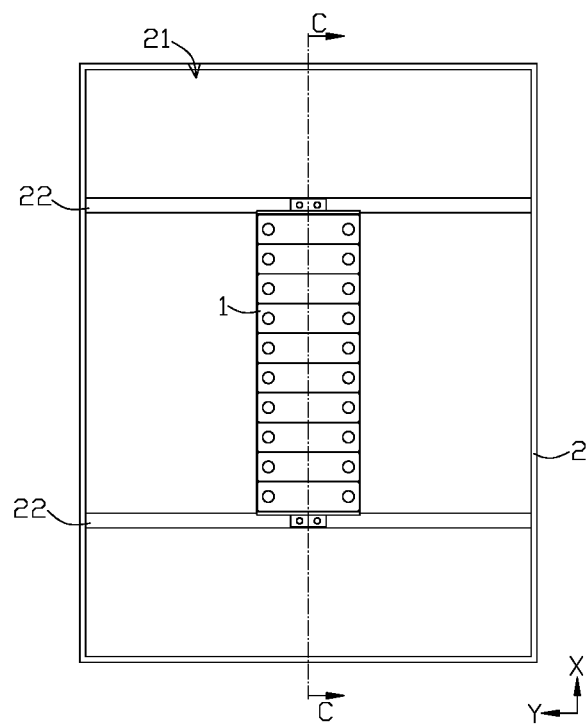
FIG. 22 is a top view of FIG. 2, where a battery module is a third specific embodiment.
Figure 23:
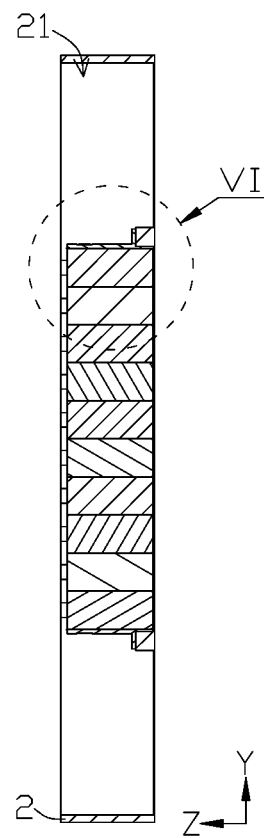
FIG. 23 is a cross-sectional view of a C-C direction in FIG. 22.

Specifically, as shown in FIG. 22, the mounting beam 22 is fitted with the second fitting portion 135 of the corresponding end plate 13. And in the length direction X, the second fitting portion 135 has a fifth bottom wall 135a, where the fifth bottom wall 135a faces the corresponding mounting beam 22, and there is a predetermined gap t between the fifth bottom wall 135a and the mounting beam 22 in the length direction X, specifically, a range of t is t<0.5 mm.

In this embodiment, the end plate 13 can be fitted with the mounting beam 22 through the second fitting portion 135, and the battery module 1 can be mounted between the two mounting beams 22 and can fit space between the two mounting beams 22 by changing the thickness of the second fitting portion 135. Additionally, when there is the predetermined gap t between the fifth bottom wall 135a of the second fitting portion 135 and the mounting beam 22 in the length direction X, the battery module 1 can be easily mounted between the two mounting beams 22. In this case, when the battery cell 111 of the battery module 1 expands in the length direction X, the predetermined gap t can provide a distance that the end plate 13 moves in the length direction X during the expansion, so as to reduce a risk of the first fitting portion 136 and the second fitting portion 135 with different thicknesses being broken due to expansion difference, which increases the service life of the end plate 13.

Additionally, when the battery cell 111 in the battery module 1 expands, the end plate 13 moves toward the mounting beam 22 in the length direction X, so that the bottom wall 135a of the second fitting portion 135 is abutted with the mounting beam 22, the second fitting portion 135 is subjected to a reverse force of the mounting beam 22, and the mounting beam 22 can limit the end plate 13 in the length direction X. In this case, when the battery cell 111 continues to expand, due to a limiting effect of the mounting beam 22, the second fitting portion 135 is no longer expands and deforms, while the first fitting portion 136 located above the second fitting portion 135 can continue to expand and deform. Therefore, in a direction from top to bottom, the deformation amount of the end plate 13 gradually decreases from top to bottom. Therefore, the end plate 13 has a structure with the large thickness above (the first fitting portion 136) and the small thickness below (the second fitting portion 135), so that the stiffness of the end plate 13 is large at the first fitting portion 136, and small at the second fitting portion 135.

Specifically, the predetermined gap t should not be too large or too small. When the predetermined gap t is too large, during the expansion of the battery cell 111, the end plate 13 moves a relatively large distance in the length direction X under the action of the expansion force. When the battery module 1 includes the cable tie 12, the deformation amount of the cable tie 12 is relatively large, resulting in that the cable tie 12 is broken before the fifth bottom wall 135a of the second fitting portion 135 in the end plate 13 contacts the mounting beam 22. And when the predetermined gap t is too small, the battery module 1 has relatively small expansion space, which is not conducive to releasing the expansion force. Therefore, comprehensively considering the above factors, a size of the predetermined gap t can be reasonably selected. For example, the predetermined gap may be 0.2 mm, 0.4 mm and so on.

Specifically, as shown in FIG. 17, the thickness of the first fitting portion 136 is t1, the thickness of the second fitting portion 135 is t2, t1>t2>⅓t1.

In this embodiment, when t1>t2, the stiffness of the first fitting portion 136 is greater than that of the second fitting portion. when t2>⅓t1, a difference between the stiffness of the first fitting portion 136 and that of the second fitting portion 135 is not too large, so as to reduce a risk of the end plate 13 being broken between the first fitting portion 136 and the second fitting portion 135 under the action of the expansion force due to an excessive deformation difference of between the two.

More specifically, as shown in FIG. 17, in the height direction Z, the end plate 13 has a first height L1, and the second fitting portion 135 has a second height L2, L2≤⅓L1.

In this embodiment, the second height L2 of the second fitting portion 135 with the relatively small thickness should not be too large, that is, less than or equal to ⅓ of the overall height of the end plate 13, so as to prevent relatively low overall strength of the end plate 13 when the height of the second fitting portion 135 is too high.

Figure 24:
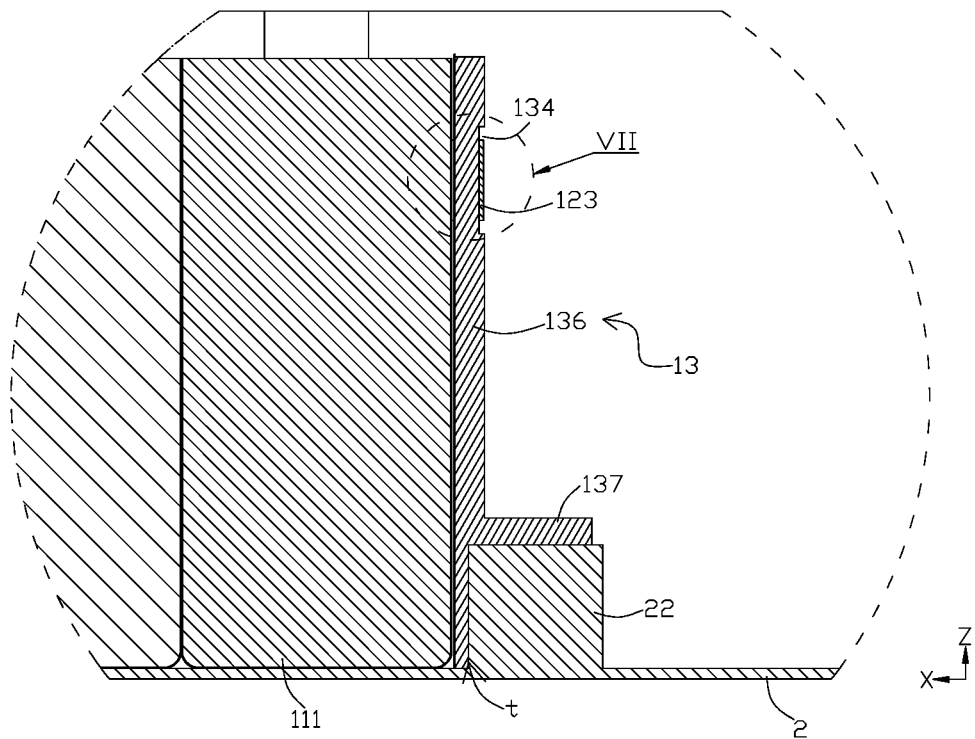
FIG. 24 is a partial enlarged view of part VI in FIG. 23.
Figure 27:
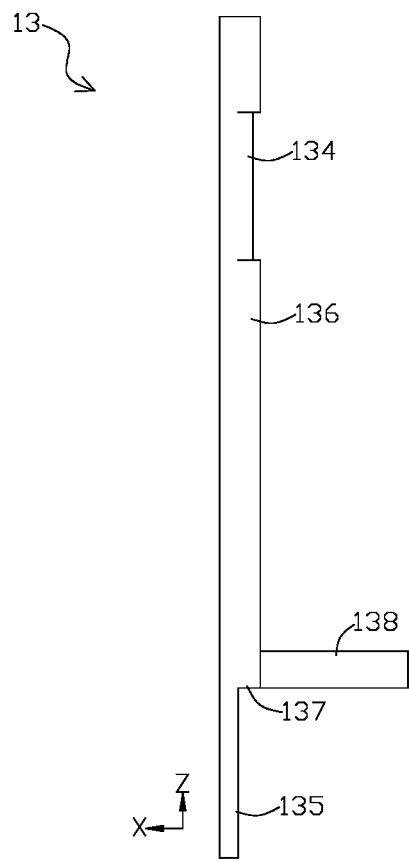
FIG. 27 is a side view of FIG. 26.

In a possible design, as shown in FIGS. 24 and 27, a step portion 137 is formed between the first fitting portion 136 and the second fitting portion 135, and in the height direction Z, the mounting beam 22 is abutted with the step portion 137.

Therefore, in this embodiment, the height of the second fitting portion 135 is equal to that of the mounting beam 22, so that when the battery module 1 is mounted in the box body 2, the step portion 137 of the end plate 13 can be abutted with an upper surface of the mounting beam 22, so that the mounting beam 22 supports the end plate 13 in the height direction Z, which can improve the connection reliability between the mounting beam 22 and the end plate 13.

Figure 26:
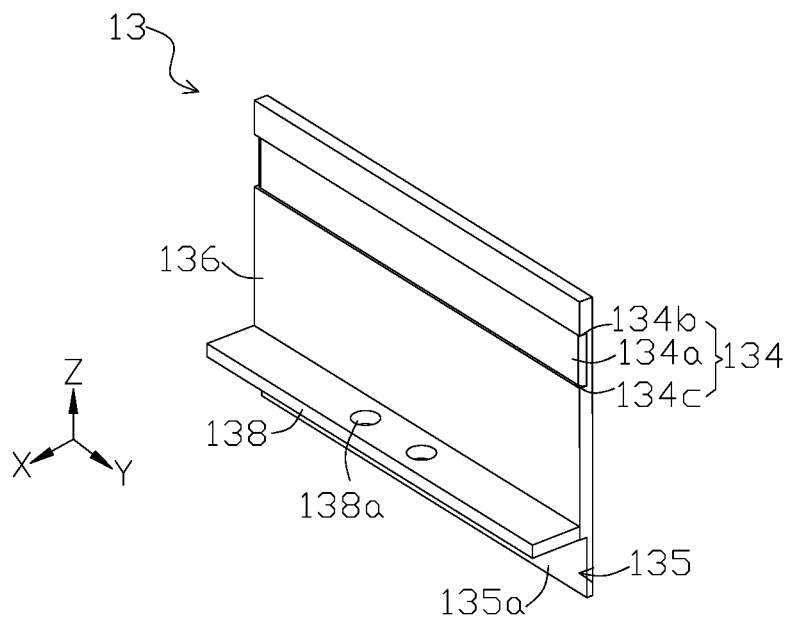
FIG. 26 is a schematic structural diagram of an end plate in FIG. 23.

Furthermore, as shown in FIGS. 26 and 27, the end plate 13 may further include a locking portion 138, where the locking portion 138 protrudes from the end plate 13 and extends toward the mounting beam 22. In this case, as shown in FIG. 27, a lower end surface of the locking portion 138 is flush with a step surface of the step portion 137, when the battery module 1 is mounted in the box body 2, the upper surface of the mounting beam 22 can be abutted with the step surface of the step portion 137 and a lower surface of the locking portion 138. In this case, the locking portion 138 may also be provided with a mounting hole 138a, the mounting hole 138a is used to connect with the mounting beam 22. Specifically, the mounting hole 138a may be a bolt hole, so that the end plate 13 and the mounting beam 22 can be connected by the bolts.

Figure 25:
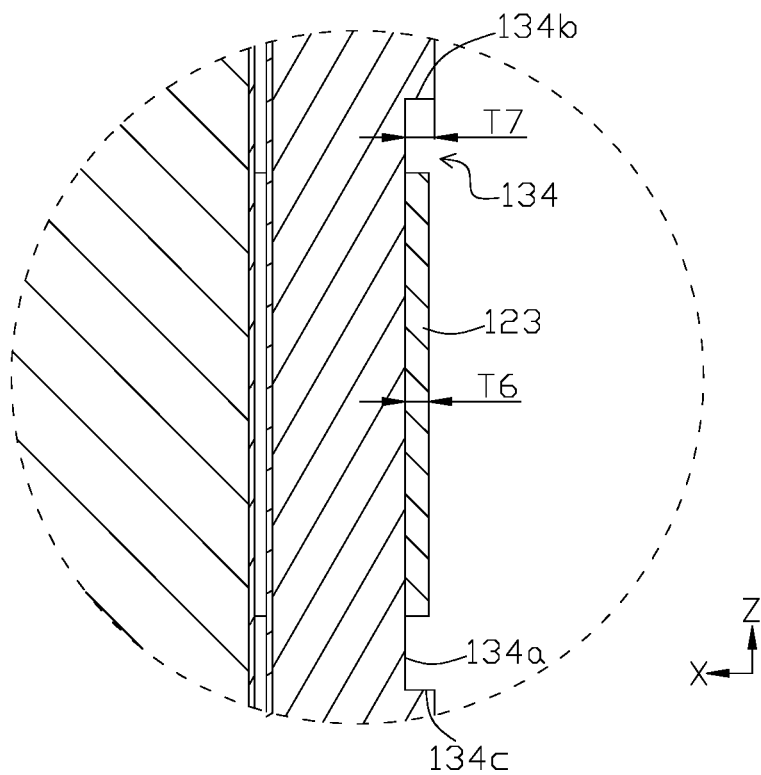
FIG. 25 is a partial enlarged view of part VII in FIG. 24.

In a specific embodiment, as shown in FIGS. 24 and 25, the battery pack M may further include a third cable tie 123, and in the height direction Z, the third cable tie 123 surrounds an upper portion of the battery cell arrangement structure 11 away from the mounting beam 22.

In this embodiment, when the battery cell 111 of the battery module 1 expands so that the end plate 13 moves close to the mounting beam 22, the two mounting beams 22 can limit the end plate 13 through the second fitting portion 135, so as to improve the grouping reliability of the battery module 1 at a position corresponding to the mounting beam 22. In this case, in order to improve the reliability of the battery module 1 at the upper portion away from the mounting beam 22, the battery module 1 may also be provided with the third cable tie 123. The battery cell arrangement structure 11 can be limited in the height direction Z through the third cable tie 123 and the mounting beam 22, which improves the grouping reliability of the battery cell 111.

Specifically, as shown in FIGS. 25-27, the end plate 13 is provided with a fourth mounting groove 134. In the height direction Z, a part of the third cable tie 123 (refers to a part of the third cable tie 123 in the height direction) is located in the fourth mounting groove 134. In this embodiment, in the length direction X, the fourth mounting groove 134 has a fourth bottom wall 134a. When the part of the third cable tie 123 is located in the fourth mounting groove 134, the third cable tie 123 is abutted with the fourth bottom wall 134a in the length direction X. In this case, in the height direction Z, the fourth mounting groove 134 has a fourth upper side wall 134b and a fourth lower side wall 134c arranged opposite to each other. And in the height direction Z, the third cable tie 123 is located between the fourth upper side wall 134b and the fourth lower side wall 134c.

In a specific embodiment, in the height direction Z, the third cable tie 123 may also be abutted with both the fourth upper side wall 134b and the fourth lower side wall 134c, or the third cable tie 123 may not be abutted with at least one side wall of the fourth mounting groove 134. In the embodiment shown in FIG. 25, in the height direction Z, the third cable tie 123 is not abutted with both the fourth upper side wall 134b and the fourth lower wall 134c.

In this embodiment, by arranging the fourth mounting groove 134 on the end plate 13, the fourth upper side wall 134b and the fourth lower side wall 134c of the fourth mounting groove 134 can restrict a movement of the third cable tie 123 in the height direction Z, so that the connection reliability between the third cable tie 123 and the end plate 13 can be improved.

Specifically, as shown in FIG. 25, the third cable tie 123 has a sixth thickness T6, and the depth of the fourth mounting groove 134 is T7, 0<T7−T6<0.5 mm.

In this embodiment, the depth T7 of the fourth mounting groove 134 is greater than the sixth thicknesses T6 of the third cable tie 123, so that the third cable tie 123 does not increase the dimension of the battery module 1 in the length direction X after it is arranged, which is conducive to the spatial arrangement of the battery module 1. In this case, the depth of the first mounting groove 131 should not be too large (T7−T6<0.5 mm), so as to avoid that the strength of the end plate 13 at a position where the fourth mounting groove 134 is provided is too low due to the excessive depth of the fourth mounting groove 134, which increases the service life of the end plate 13.

The above descriptions are only preferred embodiments of the present application, and are not intended to limit the present application. For those skilled in the art, the present application can have various modifications and changes. Any modification, equivalent substitution, improvement or the like, made within the spirit and principle of the present application shall fall within the protection scope of the present application.

What is claimed is:
1. A battery module, comprising:
 a battery cell arrangement structure comprising a plurality of battery cells stacked upon one another;
 a cable tie, the cable tie surrounding outside the battery cell arrangement structure along a length direction, and at least comprising a first cable tie and a second cable tie of different materials; and wherein tensile strength of the first cable tie is greater than that of the second cable tie, and an elastic modulus of the first cable tie is greater than that of the second cable tie; and wherein at least part of the first cable tie is located on a side of the second cable tie facing to the battery cell; and wherein at least part of the first cable tie in a height direction is located inside the second cable tie in the height direction.

2. The battery module according to claim 1, wherein the first cable tie comprises a metal cable tie, and the second cable tie comprises a plastic cable tie.

3. The battery module according to claim 1, wherein in a height direction of the battery module, at least part of the first cable tie is abutted with the second cable tie.

4. The battery module according to claim 3, wherein the first cable tie has a first width W1, and the second cable tie has a second width W2, W1≤W2; and in the height direction, an abutting height of the second cable tie and the first cable tie is W3, W3≥½ W1.

5. The battery module according to claim 4, wherein W3=W1=W2.

6. The battery module according to claim 3, wherein the first cable tie is connected by a first tie body to form an annular first cable tie, and a first connection area is formed at a junction;

the second cable tie is connected by a second tie body to form an annular second cable tie, and a second connection area is formed at a junction; and the first connection area and the second connection area are staggered from each other.

7. The battery module according to claim 6, wherein one of the first connection area and the second connection area is located at an end of the battery cell arrangement structure in the length direction, and the other is located at an end of the battery cell arrangement structure in the width direction.

8. The battery module according to claim 1, wherein the first cable tie comprises a bending structure, so that the bending structure is capable of deformation when the first cable tie is stressed.

9. The battery module according to claim 8, wherein the first cable tie is an annular wave structure.

10. The battery module according to claim 9, wherein at least part of the annular wave structure is straightened when the first cable tie is stressed.

11. The battery module according to claim 8, wherein a length of the first cable tie is greater than a perimeter of the battery cell arrangement structure, and the length of the first cable tie is greater than that of the second cable tie; and the second cable tie surrounds outside the first cable tie, so that the second cable tie squeezes the first cable tie to form the bending structure.

12. The battery module according to claim 1, wherein the battery module further comprises an end plate, and the end plate is located on an end of the battery cell arrangement structure in a length direction; and the end plate is provided with a first mounting groove, and a part of the first cable tie and a part of the second cable tie are located in the first mounting groove.

13. The battery module according to claim 12, wherein in the length direction of the battery cell arrangement structure, the first mounting groove has a first bottom wall, the first cable tie is abutted with the first bottom wall; and in the height direction of the battery cell arrangement structure, the first mounting groove has a first upper side wall and a first lower side wall arranged opposite to each other, a part of the first cable tie and a part of the second cable tie are both located between the first upper side wall and the first lower side wall.

14. The battery module according to claim 12, wherein in a thickness direction of the end plate, a depth of the first mounting groove is T3, a thickness of the first cable tie is T1, and a thickness of the second cable tie is T2; and wherein T1+T2≤T3≤T1+T2+1 mm.

15. A battery pack comprises a box body and a battery module, and the battery module is fixed in the box body;

wherein the battery module comprises:

a battery cell arrangement structure comprising a plurality of battery cells stacked upon one another;

a cable tie, the cable tie surrounding outside the battery cell arrangement structure along the length direction, and at least comprising a first cable tie and a second cable tie of different materials; and wherein tensile strength of the first cable tie is greater than that of the second cable tie, and an elastic modulus of the first cable tie is greater than that of the second cable tie; and wherein at least part of the first cable tie is located on a side of the second cable tie facing to the battery cell; and wherein at least part of the first cable tie in the height direction is located inside the second cable tie in the height direction.

16. The battery pack according to claim 15, wherein in the height direction, one end of the battery cell arrangement structure is fixedly connected with the box body, and the first cable tie and the second cable tie surround the other end of the battery cell arrangement structure.

17. The battery pack according to claim 15, wherein the first cable tie comprises a metal cable tie, and the second cable tie comprises a plastic cable tie.

* * * * *